United States Patent
Rose

(10) Patent No.: US 7,422,250 B2
(45) Date of Patent: Sep. 9, 2008

(54) VEHICLE HOOD LATCH PROTECTOR

(75) Inventor: Michael T. Rose, Cave Creek, AZ (US)

(73) Assignee: AutoGuard Devices, LLC, Phoenix, AZ (US)

( * ) Notice: Subject to any disclaimer, the term of this patent is extended or adjusted under 35 U.S.C. 154(b) by 205 days.

(21) Appl. No.: 10/966,713

(22) Filed: Oct. 15, 2004

(65) Prior Publication Data

US 2006/0082165 A1  Apr. 20, 2006

(51) Int. Cl.
*E05B 17/00* (2006.01)
(52) U.S. Cl. .................. 292/346; 292/DIG. 14
(58) Field of Classification Search ............ 292/24, 292/25, 121, 122, 126, 128, DIG. 14, 346
See application file for complete search history.

(56) References Cited

U.S. PATENT DOCUMENTS

| | | | | |
|---|---|---|---|---|
| 2,286,740 A | * | 6/1942 | Krause | 292/336 |
| 2,865,668 A | * | 12/1958 | Krause | 292/216 |
| 2,877,038 A | * | 3/1959 | Kramer | 292/216 |
| 3,199,322 A | * | 8/1965 | Braun et al. | 70/240 |
| 4,045,064 A | * | 8/1977 | Okada | 292/125 |
| 4,456,289 A | * | 6/1984 | Badiali | 292/28 |
| 4,836,591 A | * | 6/1989 | Faust | 292/336.3 |
| 5,435,609 A | * | 7/1995 | Igata et al. | 292/346 |
| 5,445,421 A | * | 8/1995 | Ferrara | 292/216 |
| 5,618,069 A | * | 4/1997 | Konchan et al. | 292/216 |
| 5,752,346 A | * | 5/1998 | Kritzler et al. | 49/503 |
| 6,014,876 A | * | 1/2000 | Taylor | 70/240 |
| 6,158,789 A | * | 12/2000 | Fett et al. | 292/346 |
| 6,546,767 B1 | * | 4/2003 | Kirejczyk et al. | 70/237 |
| 7,059,639 B2 | * | 6/2006 | Gates et al. | 292/125 |

* cited by examiner

*Primary Examiner*—Gary Estremsky
(74) *Attorney, Agent, or Firm*—Timothy M. Barlow

(57) ABSTRACT

A protector to shield a hood latch and hood latch cable from disablement by a tool thrust through the vehicle's grille.

5 Claims, 2 Drawing Sheets

VEHICLE HOOD LATCH PROTECTOR

FIELD OF THE INVENTION

A protector for the hood latch of a vehicle to resist the release of the latch by penetration of the vehicle's grille.

BACKGROUND OF THE INVENTION

The interplay between designers of vehicles and thieves who would steal the vehicle itself to gain access to the vehicle to remove saleable parts is unending. It is not long after some prevention means is invented and installed before thieves will scheme and design ways to overcome them. All too often the thieves will find some means to accomplish this.

This invention is intended to prevent entry into a vehicle by a known, simple, and currently effective technique. It is expected to solve a serious exposure at a minor expense.

With the establishment of the On Star system, the theft of vehicles equipped with it has become less desirable. A vehicle so equipped can be tracked by the system and located very quickly. A thief then has only a very limited amount of time to work with the vehicle. The risk of quick apprehension if the vehicle is moved removes the value of the vehicle itself to the thief. It does not, however, affect the value of parts or components of the vehicle if the vehicle itself does not have to be moved. On Star will not be alerted to such a circumstance, and the thief can work at leisure.

Similarly, the Lo-Jack system is useless, because at best it says the vehicle has been stolen—not where it is.

So as a result, a standing vehicle (assuming the alarm can be disabled, which can be done) is prone to the theft of very expensive parts and accessories, such as wheels from top of the line SUV's. For this purpose, access to the engine compartment is critical. With the hood open, the battery can be disabled by cutting a battery cable, and the vehicle is exposed to every risk except that if it is moved, there is a risk. But the vehicle itself will not be moved.

The resistance to this event is the hood latch. When closed, the hood latch is spring-loaded closed. It is released by a pull on a sheathed cable controlled from inside the vehicle. When the cable wire is pulled, the latch lock is released and access is enabled to fully release the latch and open the hood.

After that, the vehicle is exposed to depredation, especially of its wheels and tires. The owner will return to find his vehicle on its axles and rotors, or on cheap jacks.

In General Motors SUV's, the hood latch is customarily attached to the frame or radiator core support. It faces forwardly and is covered by a grille that allows for the flow of cooling air to the radiator. Unfortunately it also allows access to a thief who does not mind damaging the grille.

For purposes of access, he thrusts a strong, sharp screw driver through the grille, finds the latch and springs it. It is as simple as that.

Alternatively, again through the grille he can secure access to the cable and wire that operate the latch. For this he penetrates the grille with a suitable cutter instead of a screwdriver. He cuts the cable through its sheath, and then uses the tool to grab the enclosed wire and pulls it to release the latch. This is more trouble that the screwdriver technique, but still is useful.

It is the object of this invention to protect the latch, and preferably also the cable from access through the grille, and thereby make this type of incursion more difficult or time consuming. As a convenient mode of theft, it is no longer such.

BRIEF DESCRIPTION OF THE INVENTION

A latch protector according to this invention comprises a shroud having a wall to cover the release part of the latch. The protector includes an upper edge to pass a latch hook for engagement with a hood catch, and side access for a cable to release the hook.

Mounting flanges enable the protector to be attached to a vehicle mount.

According to a preferred but optional feature of the invention, a rigid channel acting as a shroud is provided as a cable protector proportioned and arranged to receive and cover a length of the cable, and adapted to be attached to a vehicle mount.

Direct access to the latch, and preferably also to the cable by an instrument brought against the protector and/or the cable through the grille of the vehicle, is prevented.

The above and other features of this invention will be fully understood from the following detailed description and the accompanying drawings, in which:

DETAILED DESCRIPTION OF THE INVENTION

Figure 1:
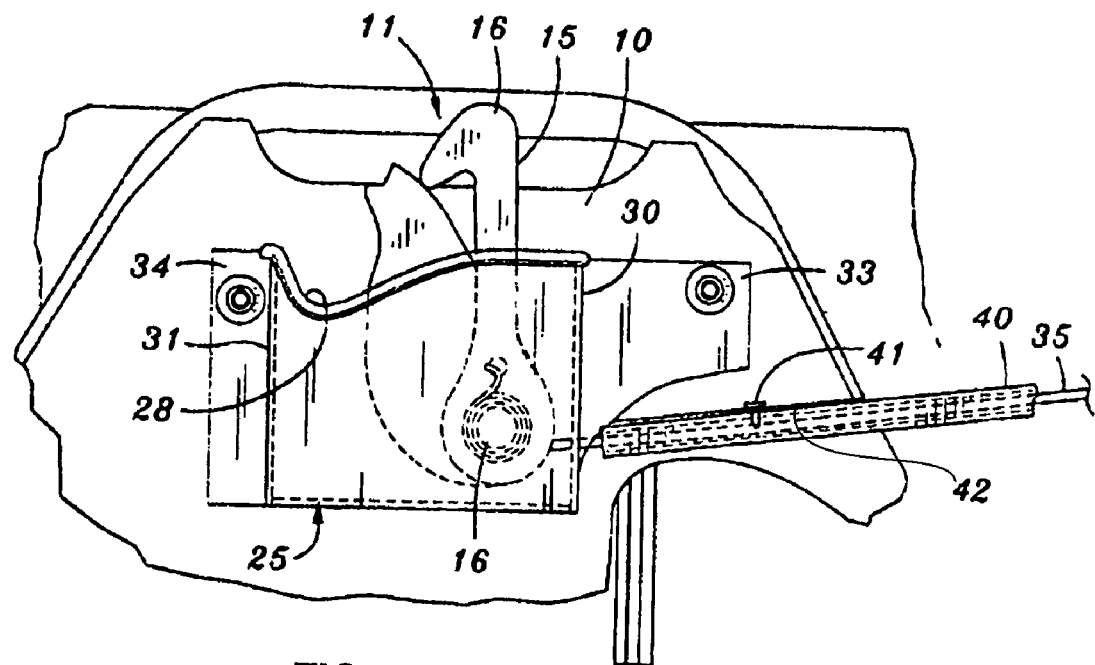
FIG. 1 is a front view of the invention.
Figure 2:
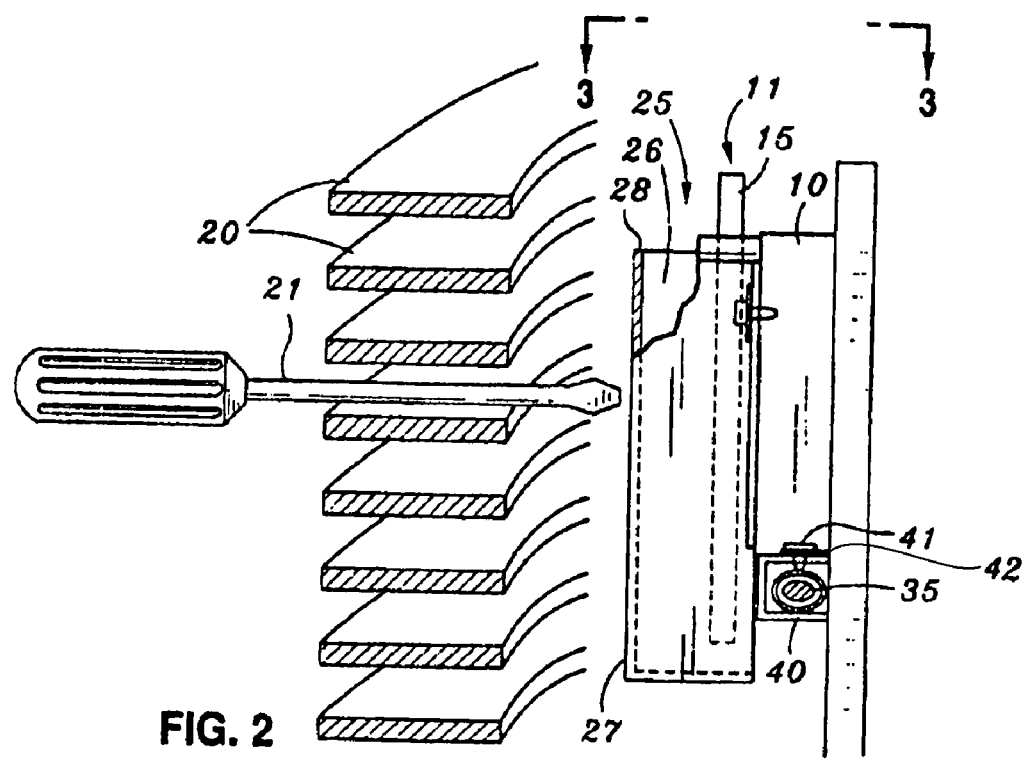
FIG. 2 is a partial right hand side view of FIG. 1, partly in cross-section.
Figure 3:
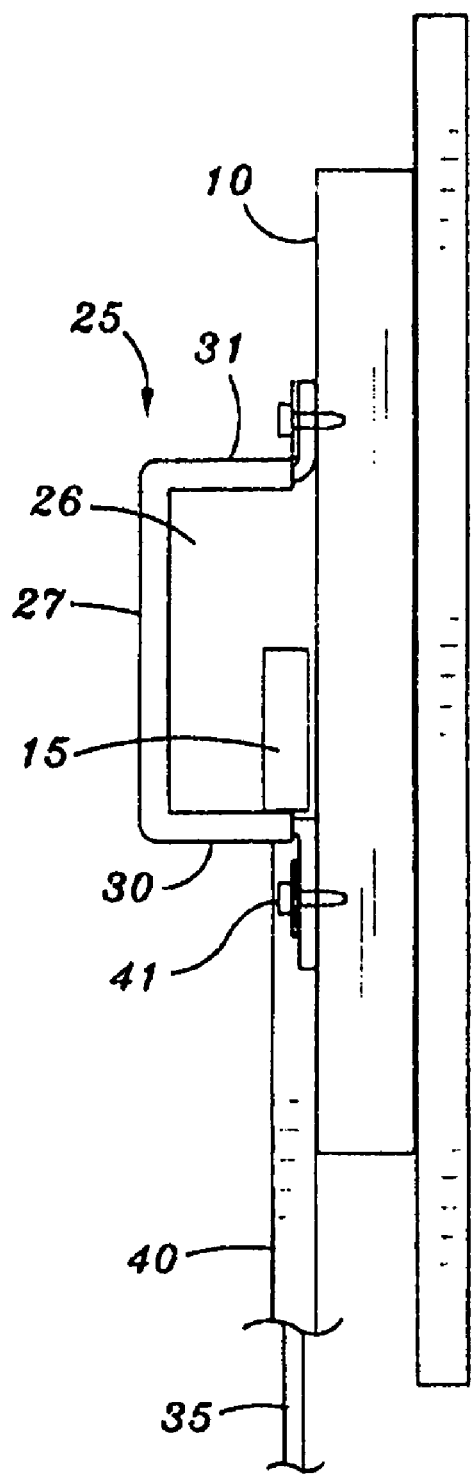
FIG. 3 is a fragmentary top view taken at line 3-3 in FIG. 2.

FIGS. 1 and 2 show a portion of a radiator core support 10 which forms part of the vehicle frame structure. It supports the core of a radiator (not shown). This is a customary place for a hood latch assembly 11 to be mounted. This assembly is attached to support 10 by any suitable means. This arrangement is merely one of many similarly intended installations, and not a limitation on the invention.

Of importance to this invention is a latch 15 that forms part of the hood locking system. It has a hooked end 16. It is spring-loaded to a locked portion (shown in FIG. 1). This latch is pivotally supported in its assembly mount, and is adapted to be engaged to or released from a catch (not shown) on the hood (also not shown).

A vehicle grille 20 is mounted ahead of this assembly. It passes air to the radiator and provides a shield for the latch. Unfortunately, without the protection of this invention, a screwdriver 21 can be pressed through the grille and used to trip the latch. It will damage the grille, but a thief is not concerned by this.

The protector 25 itself is a unitary part made of a strong material, preferably metal, sufficiently strong to resist penetration by a sharp instrument such as the screwdriver. It forms a pocket 26 to shroud the lower part of the latch where latch release forces are exerted.

The protector includes a front face 27. An upper edge 28 may be relieved to accommodate adjacent or potentially interfering structures. The fact that the hook itself appears to be exposed is not important. This is because the hook is latched in its closed position and cannot be released by force on it while latched. It can only be retracted after having been released by a pull on a cable to be described, or by a screwdriver's force exerted on the latch near to where the cable wire is connected.

Side walls 30 and 31 extend from the front face, and with a bottom 32 from an open-topped pocket which acts as a shroud for the latch. A pair of lugs 33, 34 can be attached by screws to supporting vehicle structure.

A cable 35 enters the protector through a gap at one of its sides. It is a conventional cable 35 with a cable cover and an inside wire. The cover is stationary, and the wire can be pushed or pulled inside t to operate the latch. Access to the wire can be obtained by cutting through the cover.

This is prevented by a cable shroud 40. The shroud 40 is a U-shaped metal body held to a shroud lug 42 by a screw 41 threaded into both of them. The cable shroud 40 prevents access to the cable 35 by a screwdriver or grasping means. Its end nearest to the protector preferably is placed inside the pocket. The other end is located at an inconvenient location for access by a tool.

Thus access to the hood by invasion through the grill with a screwdriver or grasping tool is frustrated. The tool cannot breach the latch to release it because of the cover, and the cable cannot be reached through the shroud. The vehicle and its expensive parts are spared this depredation because without access to the engine compartment all security systems remain active, and the time available to the thief is too short for him.

This invention is not to be limited by the embodiment shown in the drawings and described in the description, which is given by way or example and not of limitation, but only in accordance with the scope of the appended claims.

I claim:

1. A guarded latch assembly, comprising:
    a remotely-releasable latch assembly;
    a guard located between the latch assembly and a vehicle grille, the guard adapted to enclose the latch assembly of a vehicle hood fastener;
    a pocket between and separating the guard from the latch assembly, the latch assembly having a primary latch bolt shielded from access by the guard, the guard including
    a unitary metal body having a featureless and aperture-free planar front face with a relieved upper edge;
    a pair of generally parallel planar sides, which are generally perpendicular to the front face;
    a bottom face, opposite the relieved upper edge, which is generally perpendicular to both the front face and sides;
    a pair of mounting lug attached to the sides and generally parallel to the front face, the mounting lugs adapted to attach the guard to the vehicle structure; and
    a release cable which passes through the guard adjacent a side and away from the front face, and attached to the latch assembly at a location rendered inaccessible by the guard.

2. The guarded latch assembly of a vehicle hood fastener according to claim 1, further comprising:
    a shroud lug attached to the vehicle structure; and
    a cable shroud mounted to the shroud lug and including a rigid C-shaped channel and having a length at least ten (10) times its width, whereby a length of exposed actuator cable corresponding to the length of the cable shroud is concealed by the cable shroud.

3. The guarded latch assembly of a vehicle hood fastener of claim 2, where the opening of said C-shaped channel faces away from the plane of the front face.

4. The guarded latch assembly of a vehicle hood fastener of claim 1, where the relieved edge of the guard includes a secondary latch access slot.

5. The guarded latch assembly of a vehicle hood fastener of claim 1, where the vehicle structure comprises a radiator support member.

* * * * *